United States Patent [19]

Wich

[11] 4,329,958
[45] May 18, 1982

[54] DIESEL FUEL PUMP HYDRAULIC GOVERNOR CONTROL MECHANISM

[75] Inventor: Thomas J. Wich, Grand Rapids, Mich.

[73] Assignee: General Motors Corporation, Detroit, Mich.

[21] Appl. No.: 211,055

[22] Filed: Nov. 28, 1980

[51] Int. Cl.³ .............................................. F02D 7/00
[52] U.S. Cl. ..................................... 123/387; 123/449
[58] Field of Search ............... 123/385, 386, 387, 446, 123/449

[56] References Cited

U.S. PATENT DOCUMENTS 3,059,579 10/1962 Bessiere ............................... 123/387
3,530,672 9/1970 Wolff ................................... 123/379
3,648,673 3/1972 Knape .................................. 123/379
3,851,635 12/1974 Murtin et al. ........................ 123/458

Primary Examiner—Ira S. Lazarus
Assistant Examiner—Magdalen Moy
Attorney, Agent, or Firm—Arthur N. Krein

[57] ABSTRACT

A hydraulic control mechanism for controlling timing and output as a function of speed and throttle position on a diesel engine fuel injection pump. The hydraulic control mechanism includes two valves and three flow orifices arranged to control governing fluid pressure supplied to the pump so as to provide idle governing and overspeed governing as well as load control in between of the pump.

3 Claims, 2 Drawing Figures

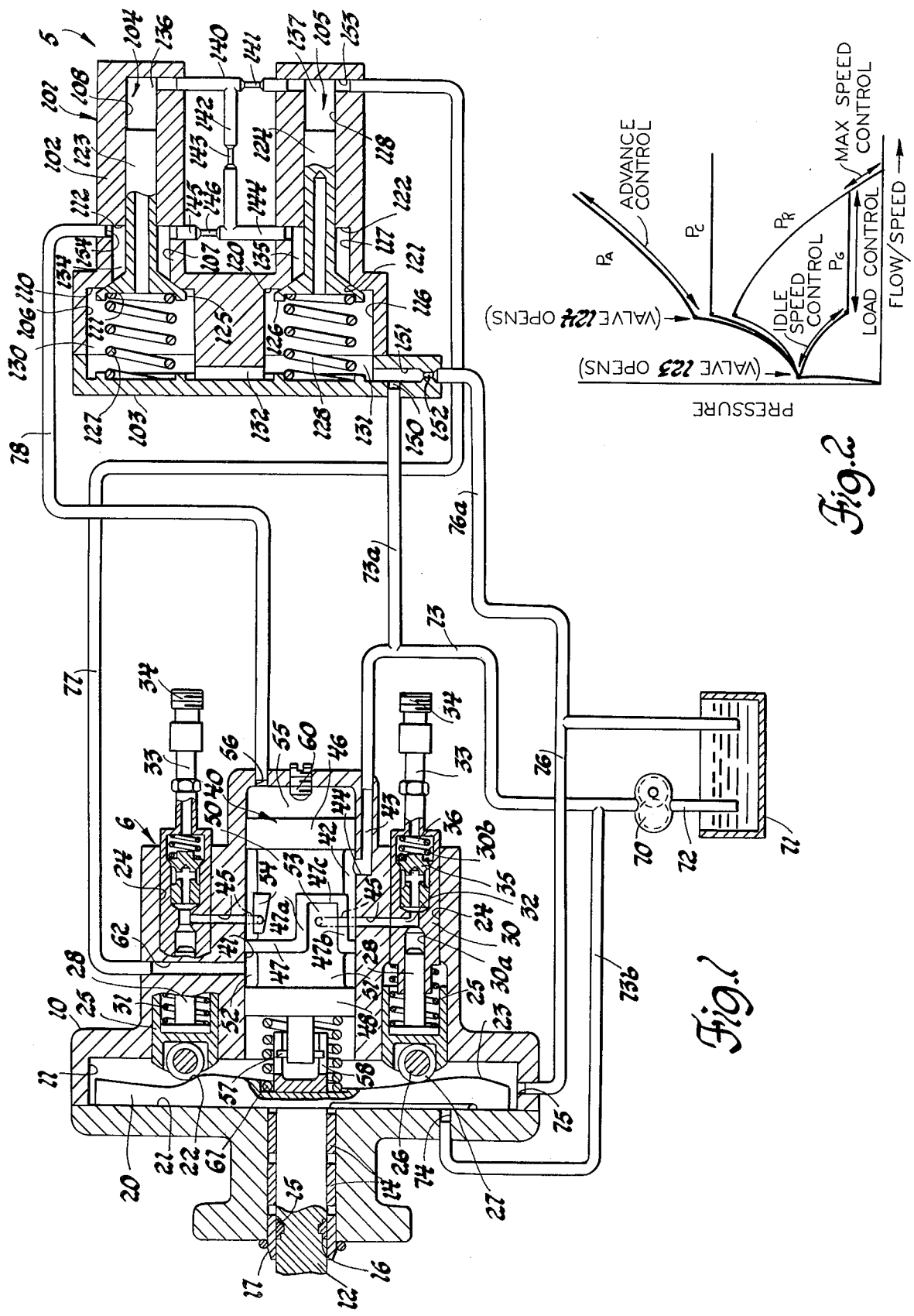

DIESEL FUEL PUMP HYDRAULIC GOVERNOR CONTROL MECHANISM

FIELD OF THE INVENTION

This invention relates to a diesel fuel injection pump hydraulic governor control mechanism, the pump being of the type adapted to deliver metered amounts of fuel to each of a plurality of fuel injection nozzles of an internal combustion engine.

DESCRIPTION OF THE PRIOR ART

Multiple plunger fuel injection pumps of the type used to sequentially supply fuel to a plurality of injection nozzles for direct injection into the associated cylinders of a diesel engine are well known. One form of this type pump is disclosed, for example, in U.S. Pat. No. 3,648,673 entitled Fuel Injection Pump issued Mar. 14, 1972 to Richard S. Knape. In this type multiple plunger fuel injection pump, a rotatable, landed control valve, which is also axially movable as by a mechanical or hydraulic governor mechanism, is used to control the quantity of fuel supplied to each nozzle for injection into an associated cylinder as a function of engine speed and load condition.

In the pump structure disclosed in the above identified U.S. Pat. No. 3,648,673, a hydraulic type all-speed governor, operated by spill fuel, is used to control movement of the landed control valve in one axial direction against the bias force of a governor spring tending to move the landed control valve in the opposite direction. However, in this particular pump arrangement, since the spill fuel is interrupted and not uniform, as supplied during each injection pump stroke of a plunger, the governor control of the landed control valve itself will vary accordingly. To eliminate this problem, it has been proposed as disclosed in co-pending U.S. application Ser. No. 098,079 now U.S. Pat. No. 4,301,777, entitled Fuel Injection Pump, filed Nov. 28, 1979 in the name of Richard G. Grundman and Richard S. Knape, that the drive cam used to actuate the pump plungers be provided with a pair of cam lobes so as to effect operation of each pump plunger twice during each cam revolution whereby each plunger is sequentially operated on a fuel injection stroke and also on a separate governor supply stroke.

In the above-identified co-pending U.S. patent application Ser. No. 098,079 and now U.S. Pat. No. 4,301,777, there is also disclosed an all speed hydraulic governor arrangement for use with this type pump.

SUMMARY OF THE INVENTION

The present invention relates to a two point hydraulic governor control mechanism for use with an engine driven multiple plunger fuel injection pump that is adapted to control the timing and duration of injection from the pump which has flow that is directly proportional to engine speed.

It is therefore a primary object of the invention to provide an improved hydraulic governor control mechanism for use with an engine driven multiple plunger type diesel fuel injection pump wherein the governor control mechanism consists of only two valves and three orifices that are operative to control a governor control pressure supplied to one end of a landed control valve in the pump so as to effect controlled axial movement thereof whereby to control timing and duration of fuel injection.

Another object of this invention is to provide an improved two point hydraulic governor control mechanism for an engine driven multiple plunger type fuel injection pump that is operative to provide idle governing and overspeed governing as well as load control in between during operation of the pump.

Still another object of the present invention is to provide a hydraulic governor control mechanism for use with an engine driven multiple plunger diesel fuel injection pump which mechanism includes features of construction, operation and arrangement, rendering it easy and inexpensive to manufacture, and in other respects suitable for use on a diesel fuel injection pump.

For a better understanding of the invention, as well as other objects and further features thereof, reference is had to the following detailed description of the invention to be read in connection with the accompanying drawings, wherein:

FIG. 1 is a schematic view of a preferred embodiment of a hydraulic governor control mechanism in accordance with the invention and of an associate engine driven multiple plunger diesel fuel injection pump, also shown schematically, with both being connected to a source of fuel; and, FIG. 2 is a graph showing the four pressure curves as a function of flow rate or speed in a particular embodiment of the subject hydraulic governor control mechanism of FIG. 1 during engine operation.

DESCRIPTION OF THE PREFERRED EMBODIMENT

Referring now to FIG. 1, there is schematically illustrated a preferred embodiment of a hydraulic governor control mechanism, generally designated 5, in accordance with the invention that is associated with a multiple plunger diesel fuel injection pump 6.

The fuel injection pump 6 may be any suitable multiple plunger type pump, but preferably, as schematically illustrated, it is of the type disclosed in the above-identified U.S. patent application Ser. No. 098,079.

As illustrated, the fuel injection pump 6 includes a pump housing 10, which may be a multiple piece housing, with a stepped blind bore 11 therein that extends from the drive end, that is, the left hand end with reference to FIG. 1, thereof.

A drive shaft 12, which is adapted to be driven through a suitable power take off from an engine, not shown, is rotatably journaled by a pair of axially spaced apart bearings 14 supported in the housing 10. This drive shaft 12, toward its outboard end, is provided with a T-shaped groove 15 to receive an annular seal 16, also of T-shape in cross section, that is encircled by a seal sleeve 17 press fitted into the outboard end of the bore 11.

An annular cam 20 is located in the housing in position to slidably engage an internal flat cam bearing surface 21 provided within the housing 10. This cam 20 is suitably secured to the drive shaft 12 so as to be driven thereby. For example, this interconnection between the drive shaft 12 and the cam 20 can be effected by means of opposed drive flats, not shown, provided on the shaft 12 in position to engage driven flats provided by a complementary shaped bore, not shown, in the cam 20. As shown, the cam 20 has an annular angled upper first cam surface or injection cam lobe 22 and a second cam surface or governor lobe 23 to effect reciprocation of a plurality of pump plungers by means of cam followers, all to be described in detail hereinafter, whereby to sequentially effect injection of fuel to the injectors and to also supply fuel to the hydraulic governor control mechanism 5 to be described in detail hereinafter.

The pump housing 10 is also provided with a plurality of circumferentially, equally spaced apart stepped bores 24. The number of bores 24 corresponds to the number of cylinders in the engine with which the fuel injection pump is to be used. For example, if the fuel injection pump 6 is to be used on an 8-cylinder engine, eight such bores 24 would be provided in the pump housing, only two such bores being shown in FIG. 1.

Each such stepped guide bores 24 at its enlarged diameter end has a cylindrical cam follower 25 slidably mounted therein. Each cam follower 25 carries a roller shaft 26 at one end thereof that is adapted to rotatably support a suitable cam follower roller means 27 in position for rolling contact engagement with the cam surfaces 22 and 23 of cam 20 whereby to effect reciprocation of an associated pump plunger 28. Thus each cam follower 25 has a pump plunger 28 operatively associated therewith.

As shown in FIG. 1, each such pump plunger 28 is reciprocably mounted in an associated cylinder bore 30a provided in one end of a bushing 30 suitably secured in an associated stepped bore 24. In addition, as illustrated, each such pump plunger 28 is normally bias in a direction, to the left with reference to FIG. 1, by means of a follower spring 31 which is thus also operative to bias the cam follower roller means 27 into driven engagement with the upper cam surfaces 22 and 23 of cam 20.

Bushing 30, as schematically illustrated, also serves as a valve retraction holder and is provided with a stepped bore 30b which extends from the outboard end of bushing 30 opposite cylinder bore 30a to open into the cylinder bore 30a. Thus as shown, each bore 30b at its inboard end defines an axial passage in communication with one end of the cylinder bore 30a and this passage intermediate its ends is in communication with an intersecting radial passage 32 for a purpose to be described. The bushing 30 at its outboard end is adapted to be connected by a conduit 33 to an associated conventional pressure actuated fuel injection nozzle 34. A conventional retraction valve 35 is positioned in the bushing 30 downstream of the radial passage 32 and this retraction valve 35 is normally bias into a closed position, the position shown in FIG. 1, by means of a compression spring 36.

Fuel flow to and from each of the pump chambers, as defined by the pump plungers 28 and their associated cylinder bores 30a, and the controlled discharge of fuel to the nozzles 34 is controlled by means of a landed control valve 40 housed in the pump housing 10 in a manner to be described hereinafter.

For this purpose, the pump housing 10 is provided with an internal straight circular bore wall 41, as defined by a portion of the bore 11 as schematically illustrated, that is of an internal diameter to slidably and rotatably receive the landed control valve 40.

Thus as illustrated in FIG. 1, the control valve 40 is axially and rotatably movable within the bore wall 41 and forms with it a fuel supply annulus or chamber 42 which, in operation, is filled with fuel entering by way of an inlet passage 43 that is in fluid communication with at least one radial port 44 whereby fuel can be supplied to the fuel supply chamber 42. This fuel supply chamber 42 is also in fluid communication with a plurality of circumferentially, equally spaced apart, radial spill ports 45, the number of these spill ports 45 corresponding to the number of cylinders in the associated engine.

Each such spill port 45 is in turn, aligned with one end of an associated passage 32 in a pump bushing 30. Each spill port 45 and its associated passage 32 form, in effect, both a pump supply passage and a spill passage 45-32.

Control valve 40, a spool type valve, is adapted to have both axial and rotational movement with the cavity defined by the bore wall 41 whereby to variably close or open the spill ports 45, the rotation of this valve being properly phased to the displacement of the plungers 28 as determined by the profile of cam surfaces 22 and 23. As shown, the control valve 40 is of a suitable axial extent and is provided with circumferentially outboard, middle, and inboard seal lands 46, 47 and 48, respectively, with neck portions 50 and 51 of reduced diameters therebetween to form with the bore wall 41 a governor fuel supply annulus or chamber 52 and the previously identified fuel supply chamber 42, respectively.

The outside diameter of the lands 46, 47 and 48 are sized relative to the internal diameter of the bore wall 41 whereby to effectively seal the internal fuel chambers 42 and 52 defined between respective sets of lands from each other and so that rotational movement of the control valve 40 will be operative to control fuel flow into and out of the spill ports 45.

As illustrated in FIG. 1, the middle land 47 has axial extending seal land portions 47a and 47b that are innerconnected by a circumferentially extending seal land portion 47c. These seal land portions 47a, 47b and 47c form therebetween a spill scallop or slot 53 that is sequentially placed in communication with each of the spill ports 45 for a purpose to be described. Also as shown, the open end of the slot 53 is in direct fluid communication with the governor spill chamber 52. The control valve 40 is also provided with an injector seal land 54, of predetermined size and configuration, which is located between the lands 46 and 47.

As will be apparent to those skilled in the art, the bridge width of the seal land portions 47a and 47b must be slightly larger than the width of the spill ports to prevent crossover of fluid from the supply chamber 42 to the governor supply chamber 52. In a similar manner, the circumferentially width and configuration of the injector seal land 54 is also preselected relative to the width of spill ports 45, as necessary, to effect the desired injection of fuel from the nozzle 34 for various axial positions of the control valve relative to these spill ports.

The free end, the right hand end with reference to FIG. 1, of the control valve 40 forms with the bore wall 41 a variable volume governor pressure chamber 55 supplied with regulated fluid via a passage 56 by the governor control mechanism 5 for a purpose and in a manner to be described in detail hereinafter.

Control valve 40 is operatively connected to the drive shaft for rotation therewith, preferably by means of a hydraulic advance mechanism whereby the control valve 40 can be rotatably adjusted with respect to the drive shaft so as to control fuel injection timing relative to engine speed, in a known manner.

For example, as schematically illustrated in FIG. 1, the drive shaft 12 drives the control valve 40 by means of a drive pin 57 which is operatively fixed to the control valve 40 in position to extend through helical slots 58, which as schematically illustrated, are provided for this purpose in the inboard, cup end of the drive shaft 12.

The control valve 40 is normally biased in an axial direction, to the right with reference to FIG. 1, a direction that is operative so as to reduce the volume of the governor pressure chamber 55, with axial movement of the control valve 40 in this direction being limited by the axial position of an adjusting screw 60 threaded in the cap end of pump housing 10. This biasing force on the control valve 40 is applied by means of a suitable governor spring means, schematically shown as spring 61 positioned so as to loosely encircle the driven end of the control valve.

With this arrangement, during operation of the pump 6, as driven by an engine, not shown, as engine speed increases, the pressure of fuel in the governor supply chamber 52 will increase correspondingly. The pressure of the hydraulic fluid supplied to the governor pressure chamber 55 in the injection pump 6 will depend on speed and throttle position.

When the pressure of the fluid in the governor pressure chamber 55 increases sufficiently to overcome the predetermined bias of the governor spring means, such as spring 61, it will effect movement of the control valve 40 in an axial direction, to the left with reference to the Figure. As this occurs, the helix 54 will increase in width (duration) with respect to port 45 thus increasing fuel output. When the pressure of fuel in the governor pressure chamber 55 decreases it allows the spring to again bias the control valve 40 back to the position shown, which decreases the amount of fuel injected.

Since the diesel fuel injection pump 6 does not form a part of the subject invention, it is believed that the above description thereof is adequate for an understanding of a preferred type injection pump with which the governor mechanism of the subject invention is to be used. For a more detailed description of this type diesel fuel injection pump reference is made to the above-identified U.S. patent application Ser. No. 098,079, the disclosure of which is incorporated herein by reference thereto.

Referring now to the subject matter of the invention, the hydraulic governor control mechanism 5 includes a governor housing 101 that may be formed integral with the pump housing 10, or as shown, can be formed as a separate element that is adapted to be fixed to the pump housing 10 in a suitable manner, not shown.

As schematically illustrated in FIG. 1, the governor housing 101 is preferably a multiple piece housing consisting of a governor body 102 and a cover 103 suitably secured together. The governor body 102 includes a pair of spaced apart stepped blind bores 104 and 105 positioned in spaced apart relationship to each other. Bore 104 is formed so as to define an internal cylindrical wall 106, an intermediate wall 107 and an end wall 108 with walls 107 and 108 being of progressively reduced internal diameters relative to wall 106. Walls 106 and 107 are innerconnected by a flat shoulder portion 110 and a conical shoulder portion defining a valve seat 111 for a purpose to be described. Walls 107 and 108 are innerconnected by a flat shoulder 112.

In a similar manner bore 105 defines an internal cylindrical wall 116, an intermediate wall 117 and an end wall 118 with walls 117 and 118 being of progressively reduced inside diameters relative to the wall 116. Walls 116 and 117 are innerconnected by a flat shoulder portion 120 and a conical shoulder portion defining a valve seat 121. Walls 117 and 118 are innerconnected by a flat shoulder 122.

As shown, the stem ends of a pair of servo piston valves 123 and 124 are slidably received in the bore walls 108 and 118, respectively, with the heads 125 and 126 of these valves being loosely received in the cavities defined by the walls 106 and 116, respectively. These servo piston valves 123 and 124 are normally biased in an axial direction, to the right with reference to the Figure, by springs 127 and 128, respectively, whereby the sealing surfaces of the valve heads 125 and 126 engage the valve seats 111 and 121, respectively.

The walls 106 and 116 together with the cover 103 provide a pair of supply pressure chambers 130 and 131, respectively, that are innerconnected to each other by a passage 132. As schematically illustrated, the passage 132 is defined by a slot formed in the governor body 102 next adjacent to the cover 103.

The stem portions of valves 123 and 124, next adjacent to the heads thereof, form with the walls 107 and 117 a governor pressure chamber 134 and a regulated pressure chamber 135, respectively. Walls 108 and 118 form with the free stem ends of valves 123 and 124 a control pressure chamber 136 and an advance pressure chamber 137, respectively.

The advance pressure chamber 137 is in flow communication with the control pressure chamber 136 by means of a conduit passage 140 having a restricted orifice passage 141 therein. The control pressure chamber 136 is connected in fluid communication with the regulated pressure chamber 135 by means of a conduit passage 142 with a flow orifice 143 therein that is in fluid communication with the conduit passage 140 downstream of the flow orifice 141 therein, and by means of a conduit passage 144. The regulated pressure chamber 135 is in turn in fluid communication with the governor pressure chamber 134 as by means of the conduit passage 144 connected to a conduit passage 145 having a flow orifice 146 therein.

As schematically shown in FIG. 1, the diesel fuel injection pump 6 and the hydraulic governor control mechanism 5 are both supplied with fuel, at a predetermined low supply pressure, by an engine driven fuel pump 70 from a fuel reservoir 71 via an inlet conduit 72. A supply conduit 73 from the output end of the fuel pump 70 is connected to the inlet passage 43 for supplying fuel to the pump 6. A branch supply conduit 73a connected to an inlet passage 150 in the governor housing 101 which opens, for example, into the supply pressure chamber 131 is used to supply fluid at a supply pressure Ps to both supply pressure chambers 130 and 131. A second branch supply conduit 73b is connected to a lubricating passage 74 in the pump housing 10 for supplying fuel for lubrication purposes to the internal operating components of the pump 6.

The pump housing 10 is also provided with a drain passage 75 that is connected at one end to a drain conduit 76 for returning fuel to the reservoir 71. In addition, the governor housing 101 is provided with a drain port 151 having a flow orifice 152, of predetermined size, therein which is connected by a branch drain conduit 76a for returning fuel to the reservoir 71 at a predetermined flow rate as controlled by the flow orifice 152. Since the fuel in reservoir 71 is at substantially atmospheric pressure, the drain pressure in drain conduit 76 and its branch 76a will be substantially 0 psi.

For supplying pressurized hydraulic governor supply fluid, that is, pressurized fuel to the hydraulic governor control mechanism 5, the pump housing 10 is provided with a passage 62 that opens at one end from the governor supply chamber 52 and is connected to one end of a conduit 77, the opposite end of this conduit 77 opening into a supply passage 153 in the governor body 102 opening into the advance pressure chamber 137. Controlled pressure governor fluid, as controlled by the subject hydraulic governor control mechanism 5, is then delivered to the governor pressure chamber of fuel injection pump 6 by means of a passage 154 in the governor body 102 that opens at one end into the governor pressure chamber 134 and is connected at its opposite end to one end of a conduit 78. The opposite end of this conduit 78 is connected to the passage 56 in the pump housing 10.

PUMP AND GOVERNOR OPERATION

Again referring to FIG. 1, the fuel injection pump 6 is schematically illustrated as having a plunger 28 riding on the injector cam lobe 22 so that fuel is being pumped and injected out through an injection nozzle 34, while the associated spill port 45 is covered by the injector seal land 54. As will be apparent to those skilled in the art, spill flow prior to spill port 45 closure, and after opening of this spill port, as the injection seal land 54 is rotated, will return to the supply chamber 42.

Another plunger 28 is shown in the Figure as riding on the governor cam lobe 23 whereby to deliver fuel through its associate spill port 45 to the governor supply chamber 52, with fuel from this chamber then being supplied as governor supply fluid to the advance timing pressure chamber 137 in the manner described hereinabove. With this arrangement using a second cam lobe in the form of governor cam lobe 23 it is then possible to obtain a flow rate of hydraulic governor supply fluid to the governor control mechanism 5 which is exactly proportional to pump speed and therefore engine speed.

It will also now be apparent that the lift of the governor cam lobe 23 and the size of the plungers 28 will determine the amount of hydraulic fluid directed to the hydraulic governor mechanism 5 as a function of engine speed. Due to the high volumetric efficiency of the pumping elements of the injection pump 6, the flow rate of governor supply fluid thus derived within the pump 6 for delivery to the governor control mechanism 5 is directly proportional to the rotational speed of the injection pump 6 as well as to the speed of the engine, not shown, since it is directly driven thereby. Therefore, this flow rate may be used as a speed signal in the circuitry of the hydraulic governor control mechanism 5. However, it should be realized that pressurized hydraulic fluid could alternately be supplied to this governor control mechanism 5, in a similar manner, by a separate engine driven pump (not shown), if desired.

Referring now to the governor control mechanism 5, it will be seen that each of the servo piston valves 123 and 124, as shown in FIG. 1, has two separate areas on which fluid can act in a direction to effect opening movement of that valve against the bias force of its associate spring and the pressure of the fluid in an associate supply pressure chamber acting against the face of its valve head. Thus for example, with reference to the valve 123, fluid in the control pressure chamber 136 at a pressure Pc will act against the free end face of the stem, a first area, of this valve and fluid in the governor pressure chamber 134 at a pressure Pg will act against the exposed area, a second area, on the back of the valve head 125. Thus if the pressure Pc acting on the first area increases due to an increase in speed (flow), the pressure Pg acting on the second area must decrease in order to balance the forces acting on the valve, see FIG. 2.

With this arrangement shown, the valve 124 will be operative to control three pressures, that is an advance pressure (Pa) (timing); a regulated pressure (Pr) for (overspeed control) and a control pressure (Pc) for (output control). The valve 123 is controlled by the control pressure (Pc) and thus is operative to control the governor pressure (Pg), the pressure of the fluid supplied to the governor pressure chamber 55 of the injection pump 6, which in turn controls and is directly proportional to injection pump output. The valve 123 is the only operational valve in the idle speed range (low speed). The flow control orifice 146, which may be referred to as an idle orifice, permits the control pressure (Pc) to increase with speed (flow) and thus decrease the governor pressure (Pg) to provide idle speed governing.

Thus the hydraulic circuit of the subject hydraulic governor control mechanism 5 provides four separate pressure schedules that are a function of flow rate and/or speed as shown in FIG. 2 for a particular embodiment. Thus this governor control mechanism when used with a fuel injection pump, such as the injection pump 6 shown, provides the following: (1) advance control (advance pressure Pa) for scheduling timing of injection as a function of diesel engine speed; (2) idle speed control (governor pressure Pg); (3) load or output control (governor pressure Pg) which varies output independent of speed and flow; and (4) maximum speed control (regulated pressure Pr) sometimes referred to as over-speed control.

The last three items 2, 3 and 4 are necessary for what is normally called a "min./max. governor" or a "two-point governor" on a diesel engine.

When the subject hydraulic governor control mechanism 5 is used with, for example, the diesel fuel injection pump 6 on a diesel engine, fuel injection to the cylinders of the engine is controlled by and directly proportional to the governor pressure (Pg) in the governor pressure chamber 135 that is supplied to the governor chamber 55 of the pump 6. For this reason as previously described, a positive displacement pump is necessary to provide hydraulic fluid flow to the governor which is directly proportional to engine speed.

As shown in FIG. 2, during cranking of the engine, the governor supply fluid flowing from the governor chamber 52 of the injection pump 6 to the governor control mechanism 5 causes the governor pressure (Pg) in the governor pressure chamber 134, as well as the pressures Pa, Pc and Pr, to rise rapidly so as to increase the amount of fuel being injected into the engine.

As the engine starts and as its speed increases, the pressure of fuel flowing to the control pressure chamber 136 via the passage 140 and flow orifice 141 from the advance timing chamber 137 will effect opening movement of the valve 123 relative to its valve seat 111 whereby to permit the governor pressure (Pg) in the governor pressure chamber 134 to decrease and thereby effect idle governing of the injection pump 6.

To increase the idle speed and/or to get out of the idle speed range, the effective force on the valve 123, as effected by its associated spring 127 and the pressure of fluid in the supply pressure chamber 130 acting on one side of the valve head 125 must be increased. This, in effect, is controlled by an operator advancing the throttle input to the engine. This increases Pg, which increases the amount of fuel going to the engine, which will increase the speed of the engine.

As the engine speed and therefore governor supply fluid flow from the injection pump 6 to the governor control mechanism 5 increases, the advance pressure Pa will increase to effect opening of the valve 124 against the force of the associate biasing spring 128 and the effective force of the fuel pressure in the supply chamber 131 acting against the valve head 126, to thereby allow the regulated pressure (Pr) in regulated pressure chamber 135 to drop. With Pa increasing and Pr decreasing, Pc will be more or less constant thus allowing pressure Pg to follow the throttle position independent of speed. This effects load control in between minimum and maximum speed governing. Maximum speed governing starts when the regulated pressure (Pr) in the regulated pressure chamber 135 becomes equal to the governor pressure (Pg) in governor pressure chamber 134 and continues to decrease with speed as shown in FIG. 2.

Each of the flow orifices 141, 143 and 146 is of a predetermined size which is selected so as to provide a flow restriction therethrough which will cause a pressure drop directly proportional to the flow rate therethrough. The direction of hydraulic fluid flow in the governor control mechanism 5 is in terms of pressure from advance pressure (Pa) in chamber 137 to control pressure (Pc) in chamber 136 to regulated pressure (Pr) in chamber 135. When both servo piston valves 123 and 124 are open, part of the fluid flow goes from the regulated pressure chamber 135 to the governor pressure chamber 134 and then to drain through the then open valve 123 and the balance of the fluid flow goes from the regulated pressure chamber 135 to drain through the then open valve 124 via the supply pressure chamber 131. As shown in FIG. 2, when the valve 124 is open, any increase in the advance timing pressure (Pa) supplied to the advance pressure chamber 137 from the fuel pump 6 will cause a proportional decrease in the regulated pressure (Pr) in regulated pressure chamber 135 in order to maintain a force balance on this valve. The same is true for the operation of valve 123 in that any increase in the control pressure (Pc) in control pressure chamber 136 will cause a corresponding decrease in the governor pressure (Pg) in the governor pressure chamber 134.

Again referring to FIG. 2, this graph shows all four of these pressure curves as a function of flow rate of pressurized governor fluid to the governor control mechanism 5 which flow rate increases with engine speed and therefore pump 6 speed. Starting at zero flow, all pressures are equal to zero. As the flow starts, all pressures (Pa), (Pc), (Pr) and (Pg) increase rapidly until valve 123 opens. At this point, the governor pressure Pg decreases with any increase in flow (Pa to Pc) in order to maintain a force balance on valve 123. The other three pressures, advance pressure (Pa), control pressure (Pc) and regulated pressure (Pr), continue to increase with flow until valve 124 opens. At this point, as shown in FIG. 2, regulated pressure Pr decreases with any increase in flow in order to maintain a force balance on valve 124.

Advance pressure (Pa) will continue to increase with governor supply fluid flow. Control pressure (Pc) can be tailored, as desired, to increase similar to advance pressure (Pa), to decrease similar to regulated pressure (Pr), or to remain constant, as shown in the functional embodiment of FIG. 2, by varying the relative areas, one and two, described hereinabove, of valve 124 and the flow areas of flow orifices 141 and 143. Governor pressure (Pg) which is controlled by and is inversely proportional to control pressure (Pc) will, in the particular functional embodiment shown in FIG. 2, remain constant until regulated pressure (Pr) is equal to governor pressure (Pg). At that point, valve 123 will close and then governor pressure (Pg) decreases along with regulated pressure (Pr). Thus in the construction shown in FIG. 1, since the governor pressure chamber 134 is, in effect, supplied with fluid from regulated pressure chamber 135 via conduit passages 144, 145 and flow orifice 146, the governor pressure (Pg) will decrease along with regulated pressure (Pr) and effect overspeed governing. In between idle speed and overspeed governing, the output is controlled by the force of spring 127 acting on valve 123.

As will now be apparent to those skilled in the art, the force of springs 127 and 128 and the relative working areas of the valves 123 and 124 can be preselected, as desired, for a particular pump and engine application. In a similar manner, the diameters of the flow control orifices 141, 143 and 146 and the flow control drain orifice 152 are also preselected, as desired, for a particular pump and associated engine application.

While the invention has been described with reference to a particular embodiment disclosed herein, it is not intended to be confined to the details set forth since it is apparent that various modifications can be made by those skilled in the art without departing from the scope of the invention. Thus, for example, although springs 127 and 128 have been illustrated as the forces normally biasing the valves 123 and 124, respectively, to their closed position, an electric solenoid can be used instead of the springs shown to load the valves 123 and 124, with the actuation of the solenoids controlled by a conventional onboard computer. If an electric solenoid is used only on valve 123, the only necessary input to the computer would be throttle position. If separate electric solenoids are used on valves 123 and 124, engine speed as well as throttle position inputs to the computer would be required, although other inputs such as advance pressure (Pa) and governor pressure (Pg) could be used to improve the system's accuracy. This application is therefore intended to cover such modifications or changes as may come within the purposes of the invention as defined by the following claims.

The embodiments of the invention in which an exclusive property or privilege is claimed are defined as follows:

1. A hydraulic governor control mechanism for supplying fluid at a regulated governing pressure to an engine driven fuel injection pump of the type that is supplied with fuel at a predetermined supply pressure and in which an array of cylinder injection pumps are driven by a cam, and wherein a landed control valve, slidable and rotatable in a control sleeve, is used to control the quantity of fuel supplied to each injector and to the hydraulic governor control mechanism and which forms therewith a governor chamber; said hydraulic governor control mechanism including a housing means having first and second stepped cylinders therein; each said stepped cylinder including an annular valve seat adjacent one end thereof; first and second servo valves in said first and second stepped cylinders, respectively, each of said servo valves including a stem slidably received in a reduced diameter portion of its associated stepped cylinder and a poppet type valve head loosely received in an enlarged diameter portion and which is adapted for seating engagement against its associated said valve seat; said first servo valve forming with said first stepped cylinder a bias pressure chamber at its head end, a regulated pressure chamber intermediate its ends and an advance pressure chamber at its opposite end; said second servo valve forming with said second stepped cylinder a bias pressure chamber at the free end of its head, a governor pressure chamber intermediate its ends and a control pressure chamber at its opposite end; a first passage means in said housing means connected at one end to said advance pressure chamber and adapted to be connected at its other end to a source of pressurized fuel as supplied by the injection pumps of the fuel injection pump; a first flow control orifice passage means connecting said advance pressure chamber to said control pressure chamber; a second flow control orifice passage means connecting said control pressure chamber to said regulated pressure chamber; a third flow control orifice passage means connecting said regulated pressure chamber to said governor pressure chamber; a second passage means connected at one end to said governor pressure chamber and adapted to be connected at its other end to the governor chamber of the fuel injection pump; a third passage means connected at one end to said bias pressure chambers and connectable at its other end to the source of fuel at the supply pressure; a fourth passage means connecting said bias pressure chambers for the controlled drainage of fuel therefrom to a source of fuel at substantially atmospheric pressure; and, first and second bias means operatively connected to said first and second servo valves respectively to normally bias each of said heads against its associated said valve seat, each with a predetermined force, whereby said second servo valve is operative as supplied with fluid as regulated by said first servo valve and with flow thereto controlled through said third flow control orifice passage means to regulate the pressure of fluid supplied to the governor chamber so as to control the axial position of the landed control valve as a function of engine speed and load.

2. A hydraulic governor control mechanism for supplying fluid at a regulated governing pressure to an engine driven fuel injection pump for a multicylinder diesel engine, the pump being of the type wherein an array of cylinder injection pumps driven by a cam surround a central bore and wherein a landed control valve, slidable in the bore rotates in unison with engine rotations is used to control the quantity of fuel supplied to each injector and to supply pressurized governor fluid to the hydraulic governor control mechanism and which forms therewith a governor chamber; said hydraulic governor control mechanism including a housing means having first and second stepped cylinders therein; each said stepped cylinder including an annular valve seat adjacent one end thereof; first and second servo valves in said first and second stepped cylinders, respectively, each of said servo valves including a stem slidably received in a reduced diameter portion of its associated stepped cylinder and a poppet type valve head loosely received in an enlarged diameter portion and which is adapted for seating engagement against its associated said valve seat; said first servo valve forming with said first stepped cylinder a bias pressure chamber at its head end, a regulated pressure chamber intermediate its ends and an advance pressure chamber at its opposite end; said second servo valve forming with said second stepped cylinder a bias pressure chamber at the free end of its head, a governor pressure chamber intermediate its ends and a control pressure chamber at its opposite end; a first passage means in said housing means connected at one end to said advance pressure chamber and adapted to be connected at its other end to the fuel pump used to supply pressurized governor fuel, a first flow control orifice passage means connecting said advance pressure chamber to said control pressure chamber; a second flow control orifice passage means connecting said control pressure chamber to said regulated pressure chamber; a third flow control orifice passage means connecting said regulated pressure chamber to said governor pressure chamber; a second passage means connected at one end to said governor pressure chamber and adapted to be connected at its other end to the governor chamber of the fuel injection pump; a third passage means connected at one end to said bias pressure chambers and connectable at its other end to the source of fuel at the supply pressure; a fourth passage means connecting said bias pressure chambers for the controlled drainage of fuel therefrom to a source of fuel at substantially atmospheric pressure; and, first and second bias means operatively connected to said first and second servo valves respectively to normally bias each of said heads against its associated said valve seat, each with a predetermined force, whereby said second servo valve is operative as supplied with fluid as regulated by said first servo valve and with flow thereto controlled through said third flow control orifice passage means to regulate the pressure of fluid supplied to the governor chamber so as to control the axial position of the landed control valve whereby to control timing, idle speed, load and maximum speed of the engine.

3. A hydraulic control mechanism for supplying fluid at a regulated governing pressure to an engine driven fuel injection pump for a multicylinder engine, the pump being of the type wherein an array of cylinder injection pumps surround a central bore, and wherein a landed control valve, slidable in the bore rotates in unison with engine rotations is used to control the quantity of fuel supplied to each cylinder and to supply pressurized governor fluid to the hydraulic governor control mechanism and which forms with the bore a governor chamber; and wherein a cam rotates with the landed control valve to actuate the individual injection pumps; said hydraulic governor control mechanism including a housing means having first and second stepped cylinders therein each defining an annular valve seat adjacent one end thereof; first and second servo valves in said first and second stepped cylinders, respectively, each of said servo valves including a stem slidably received in a reduced diameter portion of its associated stepped cylinder and a poppet type valve head loosely received in an enlarged diameter portion and which is adapted for seating engagement against its associated said valve seat; said first servo valve forming with said first stepped cylinder a bias pressure chamber at its head end, a regulated pressure chamber intermediate its ends and an advance pressure chamber at its opposite end; said second servo valve forming with said second stepped cylinder a bias pressure chamber at the free end of its head, a governor pressure chamber intermediate its ends and a control pressure chamber at its opposite end; a first passage means in said housing means connected at one end to said advance pressure chamber and adapted to be connected at its other end to the source of pressurized governor fluid as supplied by the fuel injection pump; first, second and third flow control orifice passage means connecting said advance pressure chamber to said control pressure chamber; connecting said control pressure chamber to said regulated pressure chamber; and connecting said regulated pressure chamber to said governor pressure chamber, respectively, a second passage means connected at one end to said governor pressure chamber and adapted to be connected at its other end to the governor chamber of the fuel injection pump; a third passage means connected at one end to said bias pressure chambers and connectable at its other end to the source of fuel at the supply pressure; a fourth passage means connecting said bias pressure chambers for the controlled drainage of fuel therefrom to a source of fuel at substantially atmospheric pressure; and, first and second bias means operatively connected to said first and second servo valves respectively to normally bias each of said heads against its associated said valve seat, each with a predetermined force, whereby said second servo valve is operative to regulate the pressure of fluid supplied to the governor chamber of the pump so as to control the axial position of the landed control valve therein whereby to control timing, idle speed, load and maximum speed of the engine by controlling fuel injection flow to the cylinders thereof.

* * * * *